(No Model.)
R. C. NUGENT.
BORING HEAD FOR BORING CYLINDERS.
No. 265,535. Patented Oct. 3, 1882.
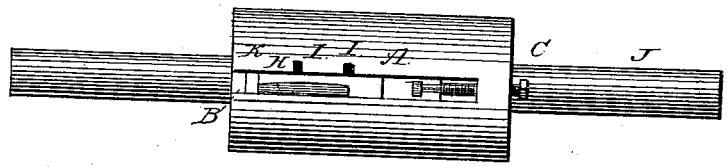
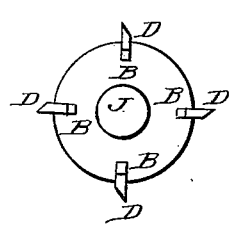 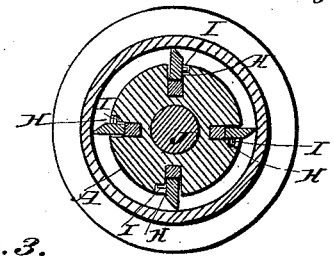
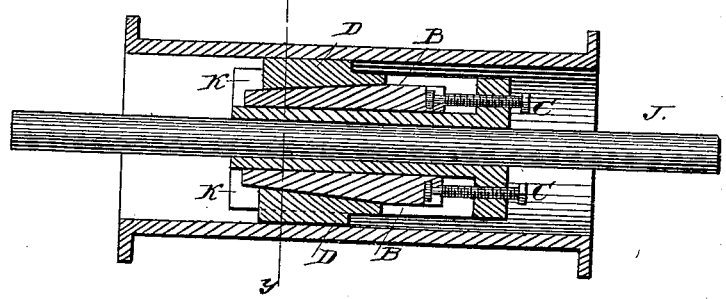
 
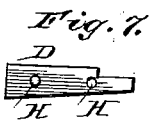
WITNESSES
Fred G. Dieterich
F. C. Dieterich
INVENTOR
Richard C. Nugent
By J. J. Johnston
Attorney

UNITED STATES PATENT OFFICE.

RICHARD C. NUGENT, OF PITTSBURG, PENNSYLVANIA.

BORING-HEAD FOR BORING CYLINDERS.

SPECIFICATION forming part of Letters Patent No. 265,535, dated October 3, 1882.

Application filed January 10, 1882. (No model.)

*To all whom it may concern:*

Be it known that I, RICHARD C. NUGENT, of Pittsburg, in the county of Allegheny and State of Pennsylvania, have invented a new and useful Improvement in Boring-Heads for Boring Out Cylinders and other Articles; and I do hereby declare that the following is a full and exact description thereof, reference being had to the accompanying drawings, and to the letters of reference marked thereon.

My invention relates to an improvement in boring-heads for boring out cylinders and other articles; and it consists in providing the head with an adjustable cutting tool or tools, whereby the said tool or tools can be expanded or contracted at the will of the operator for adapting said boring-head and its cutting tool or tools to the boring out of cylinders or other articles of different diameters.

To enable others skilled in the art with which my invention is most nearly connected to make and use it, I will proceed to describe its construction and operation.

In the accompanying drawings, which form part of my specification, Figure 1 is a top view or plan of my improvement in boring-heads for boring out cylinders and other articles. Fig. 2 is an end view of the same. Fig. 3 is a longitudinal section of a cylinder with its boring-head and cutting-tools arranged therein. Fig. 4 is a transverse section of the same at line *y y* of Fig. 3. Fig. 5 is a side view of the wedge used for adjusting the cutting tool or tools with relation to the periphery of the boring-head. Fig. 6 is a side view of the screw used for adjusting said wedges. Fig. 7 is a side view of the cutting-tool.

Reference being had to the accompanying drawings, A represents the boring-head, in which is made one or more recesses for the reception of the adjusting wedge or wedges B, screw or screws C, and cutter D. The inner end of the screw or screws C is or are furnished with a groove, G, and fitted to the wedge B, as shown in Fig. 3. The cutter D has on one side of it a pin, H, which fits in the compartment I of the recess or recesses K in the boring-head A for preventing longitudinal movement of the cutter or cutters. The contour of the adjusting-screw C, wedge B, cutter D, and boring-head A and their arrangement and relation to each other are clearly shown in the accompanying drawings. The skillful mechanic will, without further description of said parts, readily understand their construction.

The boring-head is fitted on the ordinary shaft, J, which is centered in a turning or boring lathe and revolved by a pulley in the usual manner. The recess or recesses K, having the compartments I and I properly formed in the boring-head, and the wedge or wedges B and cutter or cutters D, fitted to the said recess or recesses K, and the screw or screws C, fitted in said boring-head and coupled to said wedge or wedges, as shown in Figs. 1 and 3, and said boring-head secured on said shaft J, the operator by turning the screw or screws C can adjust the cutter or cutters D to suit the diameter to which the cylinder is to be bored out.

The cutters D are secured in the recesses K from any movement lengthwise through the medium of pins H in the compartments I when adjusting the cutters D to the diameter of the cylinder, and said pins also prevent said cutters from longitudinal movement during the operation of boring out the cylinder.

Having thus described my improvement, what I claim is—

In a boring-head hereinbefore described, the combination of the head A, screw or screws C, wedge or wedges B, and cutters D, constructed and operating substantially as herein described, and for the purpose set forth.

RICHARD C. NUGENT.

Witnesses:
A. C. JOHNSTON,
JAMES J. JOHNSTON.